(12) United States Patent
Ito

(10) Patent No.: US 11,612,153 B2
(45) Date of Patent: Mar. 28, 2023

(54) FISHING ROD

(71) Applicant: Megabass Inc., Hamamatsu (JP)

(72) Inventor: Koichi Ito, Hamamatsu (JP)

(73) Assignee: MEGABASS INC., Hamamatsu (JP)

( * ) Notice: Subject to any disclaimer, the term of this patent is extended or adjusted under 35 U.S.C. 154(b) by 0 days.

(21) Appl. No.: 17/104,839

(22) Filed: Nov. 25, 2020

(65) Prior Publication Data

US 2021/0153486 A1 May 27, 2021

(30) Foreign Application Priority Data

Nov. 27, 2019 (JP) ................. JP2019-214199

(51) Int. Cl.
*A01K 87/06* (2006.01)

(52) U.S. Cl.
CPC .................... *A01K 87/06* (2013.01)

(58) Field of Classification Search
CPC ........ A01K 87/00; A01K 87/02; A01K 87/06; A01K 87/08; F16L 27/12
USPC ............................ 43/23, 22, 18.1 R, 18.1 CT
See application file for complete search history.

(56) References Cited

U.S. PATENT DOCUMENTS

| | | | | |
|---|---|---|---|---|
| 26,015 A * | 11/1859 | Clay | ....................... | F16L 27/12 285/302 |
| 831,764 A * | 9/1906 | Bartlett | .................. | A01K 87/06 43/22 |
| 2,512,082 A * | 6/1950 | Bainbridge | ............ | A01K 87/06 411/416 |
| 4,578,890 A * | 4/1986 | Childre | .................. | A01K 87/06 43/20 |
| 5,199,207 A * | 4/1993 | Nakagawa | ............. | A01K 87/06 43/22 |
| 6,378,238 B1* | 4/2002 | Lu | .......................... | A01K 87/06 43/18.1 R |
| 2003/0145509 A1 | 8/2003 | Ito | | |
| 2016/0192628 A1* | 7/2016 | Omura | ................... | A01K 87/06 43/22 |

FOREIGN PATENT DOCUMENTS

| | | | | |
|---|---|---|---|---|
| CN | 104901027 A | | 9/2015 | |
| FR | 1536443 A | * | 8/1968 | ............. A01K 87/08 |

(Continued)

OTHER PUBLICATIONS

Translation of JP 5525941 B2 (Year: 2014).*

(Continued)

*Primary Examiner* — Darren W Ark
*Assistant Examiner* — Katelyn T Truong
(74) *Attorney, Agent, or Firm* — Birch, Stewart, Kolasch & Birch, LLP

(57) ABSTRACT

A fishing rod includes: a reel seat; a blank extending from a front end surface of the reel seat; a cylindrical spacer provided on the blank on the same axis; a hood holder screwed at a front end portion of the reel seat; a hood continuously provided at a rear end of the hood holder; and a rocker including a plurality of support parts extending frontward from near a front end of the hood holder and coming into contact with an outer peripheral surface of the spacer, wherein in a state where the hood holder is screwed into the reel seat side, a protruding part of each of the support parts is close to the spacer.

3 Claims, 4 Drawing Sheets

(56) References Cited

FOREIGN PATENT DOCUMENTS

| | | | | |
|---|---|---|---|---|
| GB | 1048123 A | * | 11/1966 | ............. A01K 87/08 |
| GB | 2444771 A | * | 6/2008 | ............. A01K 87/08 |
| JP | 3980438 B2 | * | 9/2007 | |
| JP | 4068388 B2 | | 3/2008 | |
| JP | 5525941 B2 | * | 6/2014 | |
| JP | 2019-33699 A | | 3/2019 | |
| WO | WO 2015/025360 A1 | | 2/2015 | |

OTHER PUBLICATIONS

Chinese Office Action and Search Report dated May 19, 2022 for corresponding Application No. 202011306918.0.
Korean Office Action dated Oct. 29, 2022, for corresponding Korean Application No. 10-2020-0156473, with English translation.

* cited by examiner

FISHING ROD

CROSS-REFERENCE TO RELATED APPLICATIONS

This application is based upon and claims the benefit of priority of the prior Japanese Patent Application No. 2019-214199, filed on Nov. 27, 2019, the entire contents of which are incorporated herein by reference.

BACKGROUND OF THE INVENTION

Field of the Invention

The present invention relates to a fishing rod configured such that a reel is fixed on a reel seat by moving a hood for fixing the reel to a reel seat side.

Description of the Related Art

As a fishing rod, there is a known structure in which when a front grip is screwed into a reel seat side in a state where a reel is mounted on the reel seat, a hood at a rear end of the front grip is engaged in a manner to cover a leg on the front side of the reel to fix the reel (see, for example, Patent Document 1).

Patent Document 1 discloses a configuration for preventing eccentricity of a blank extending from a front end surface of the reel seat and the front grip. More specifically, a ring member inserted in the front end of the front grip is provided, so that an inner diameter portion of the ring member is supported by a pipe-shaped member provided on an outer peripheral surface of a frame or blank projecting from the front end of the reel seat in a state where the front grip is screwed into the reel seat side.

[Patent Document 1] Japanese Patent No. 4068388

However, in the configuration of Patent Document 1, the position where the blank and the front grip support each other is limited to the position of the ring member. For example, in terms of supporting the blank on which a load acts, the stiffness can be enhanced when the blank is supported at the front as much as possible (a tip end side of the blank).

SUMMARY OF THE INVENTION

The present invention has been made in consideration of the above point and its object is to set a position where a blank is supported, to the front as much as possible.

A fishing rod of the present invention includes: a reel seat; a blank extending from a front end surface of the reel seat; a cylindrical spacer provided on the blank on the same axis; a hood holder screwed at a front end portion of the reel seat; a hood continuously provided at a rear end of the hood holder; and a rocker including a plurality of support parts extending frontward from near a front end of the hood holder and coming into contact with an outer peripheral surface of the spacer, wherein in a state where the hood holder is screwed into the reel seat side, protruding parts of the support parts are close to the spacer.

Further, in the fishing rod of the present invention, front ends of the support parts are connected to one another via a ring part.

Further, in the fishing rod of the present invention, the protruding part is formed to be inclined to protrude inward near an almost middle portion in a front-rear direction of each of the support parts.

Further, in the fishing rod of the present invention, the hood holder is rotatably coupled to the hood and the rocker is fixed on the outer peripheral surface of the hood holder.

DETAILED DESCRIPTION OF THE PREFERRED EMBODIMENTS

Hereinafter, a preferred embodiment of a fishing rod according to the present invention will be explained referring to the attached drawings.

Figure 1:
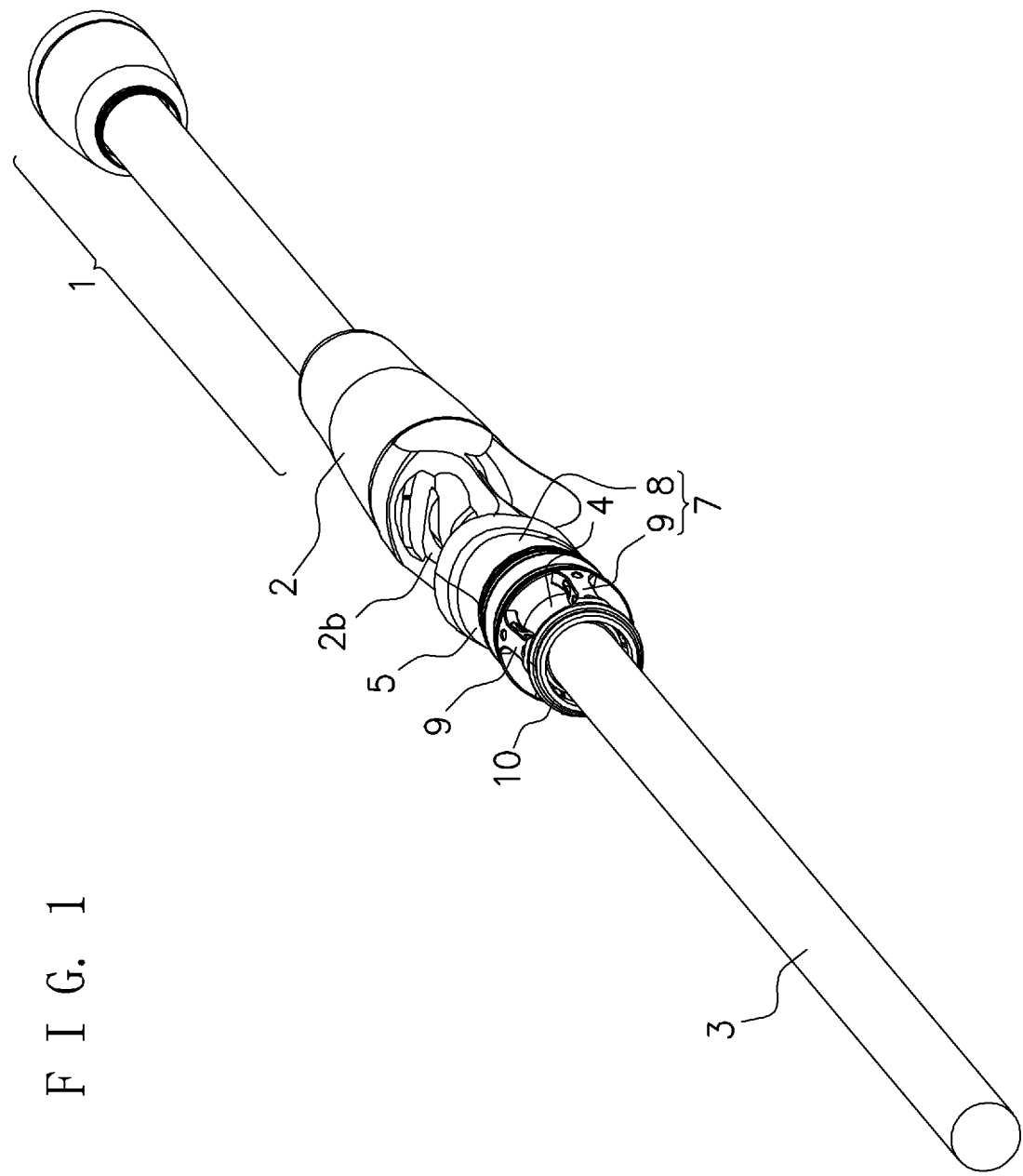
FIG. 1 is a perspective view illustrating the whole configuration of a fishing rod in an embodiment of the present invention.
Figure 2:
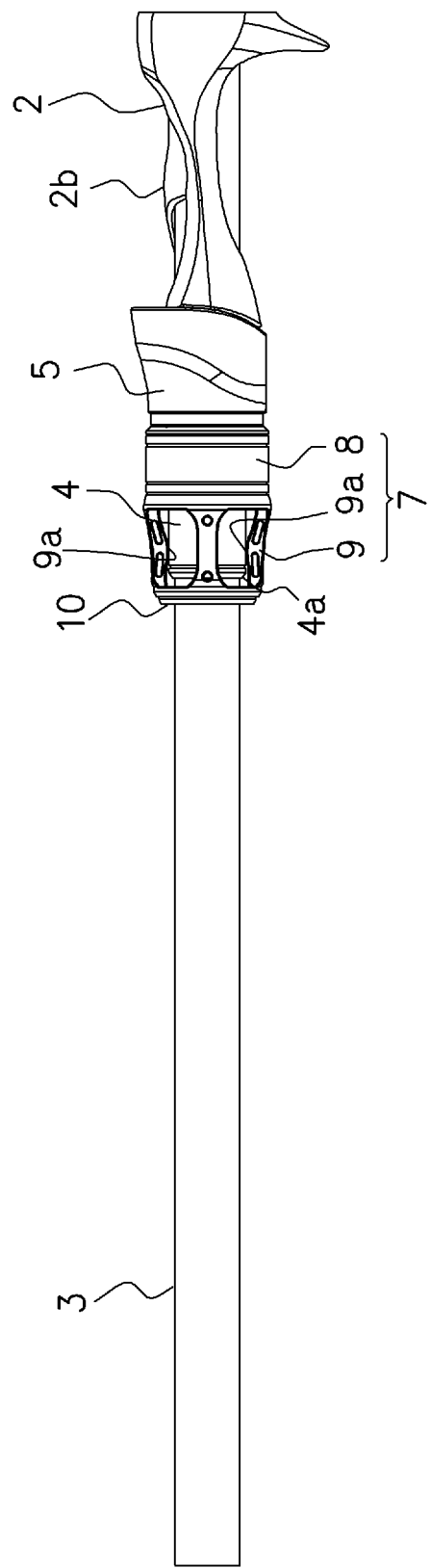
FIG. 2 is a side view illustrating an essential configuration of the fishing rod in the embodiment of the present invention.
Figure 3:
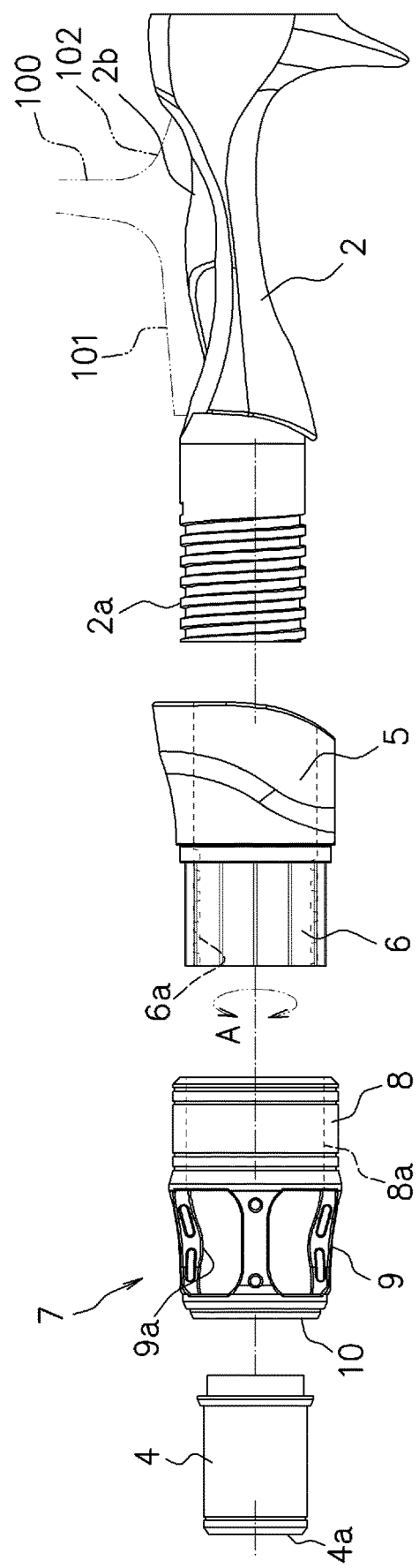
FIG. 3 is a side view illustrating parts configuration of the fishing rod in the embodiment of the present invention.

FIG. 1 to FIG. 3 illustrate the fishing rod according to an embodiment of the present invention. Note that in this application, the front and the rear are indicated assuming that the tip direction of a blank 3 is the front.

At the front of a grip 1 which is a portion gripped by a user, a reel seat 2 is continuously provided. The reel seat 2 is for attaching a reel 100 thereto, and a glass-mixed resin or the like is used for its raw material. In this embodiment, an upper surface of the reel seat 2 is a reel fixing surface 2b, and a lower surface of the reel seat 2 is integrally molded with a trigger handle around which a finger is hooked. Note that FIG. 3 is a view for explaining a schematic configuration of an area of the reel seat 2, and in FIG. 3, there may be portions not coinciding in shape, size or the like with those illustrated in FIG. 1 and FIG. 2.

From a front end surface of the reel seat 2, the blank 3 made of carbon or glass fiber extends. The fishing rod according to the embodiment has a so-called blank-through structure in which the blank 3 is inserted into the reel seat 2 and the grip 1. On the blank 3, a cylindrical spacer 4 is provided on the same axis. The spacer 4 is arranged so as to continue to the front end of the reel seat 2. At a front end portion of the spacer 4, a taper part 4a is formed. As illustrated in FIG. 3, on an outer peripheral surface of the front end portion of the reel seat 2, a screw part 2a (male screw) is formed at which a cylindrical hood holder 6 attached to the hood 5 is screwed.

The hood holder 6 is a member made of resin for fixing the reel 100 via the hood 5, and rotatably (an arrow A in FIG. 3) coupled to the hood 5. On an inner peripheral surface of the hood holder 6, a screw part 6a (female screw) screwed with the screw part 2a of the reel seat 2 is formed. The hood 5 engages in a manner to cover a leg part 101 (see FIG. 3) on the front side of the reel 100 on the reel fixing surface 2b of the reel seat 2 to fix the reel 100. In this case, the hood holder 6 is screwed into the screw part 2a of the reel seat 2.

On an outer peripheral surface of the hood holder 6, a rocker 7 is fixed. The rocker 7 is a member made of resin, and has a cylindrical part 8 bonded to the outer peripheral surface of the hood holder 6 and a plurality of support parts 9 extending frontward from a front end of the cylindrical part 8. The cylindrical part 8 has a fitting hole 8a into which the hood holder 6 is fitted, and the hood holder 6 and the rocker 7 are integrally coupled with an adhesive in a fitting state of them. Therefore, the rocker 7 integrally rotates together with the hood holder 6 with respect to the hood 5.

The plurality of support parts 9 are arranged near the front end of the cylindrical part 8, namely, a front end of the hood holder 6 in a manner to divide the circumference into a plurality of parts (four in this example), and front ends of the support parts 9 each formed in a rib shape are connected to one another via a ring part 10. Note that the quantity or the number of the support parts 9 may be three or less or five or more. Each of the support parts 9 has, near an almost middle portion in the front-rear direction, an appropriate inclination angle so as to protrude inward in the radial direction of the cylindrical part 8, so that the inner diameter at a protruding part 9a becomes substantially minimum. Therefore, the protruding parts 9a of the support parts 9 and an outer peripheral surface of the spacer 4 are coupled so that they come into contact with each other. The inner diameter of the ring part 10 is set to be larger than the outer diameter of the spacer 4.

In the above fishing rod, at the time when attaching the reel 100 as illustrated in FIG. 3, a leg part 102 on the rear side of the reel 100 is inserted into a hole formed at a rear part of the reel fixing surface 2b of the reel seat 2. Then, the hood holder 6 is screwed into the reel seat 2 side, whereby the hood 5 is engaged in a manner to cover the leg part 101 on the front side of the reel 100 and thereby can fix the reel 100 to the reel seat 2.

Here, in a state where the hood holder 6 is not screwed into the reel seat 2 side, the protruding parts 9a of the support parts 9 are located in front of the spacer 4, and a certain gap exists between the protruding parts 9a of the support parts 9 and an outer peripheral surface of the blank 3. When the hood holder 6 is screwed from this state into the reel seat 2 side by a predetermined stroke amount in order to fix the reel 100 as explained above, the protruding parts 9a of the support parts 9 move to the position of the spacer 4 as illustrated in FIG. 1, FIG. 2, whereby the protruding parts 9a get closer to the spacer 4. Since the front end portion of the spacer 4 is the taper part 4a, the protruding parts 9a of the support parts 9 are not caught by the front end portion of the spacer 4 and the hood holder 6 can be smoothly screwed into the reel seat 2 side. Note that getting closer includes a case where the protruding parts 9a of the support parts 9 come into contact with the outer peripheral surface of spacer 4 and a case where a slight gap exists between the protruding parts 9a of the support parts 9 and the outer peripheral surface of the spacer 4.

Figure 4:
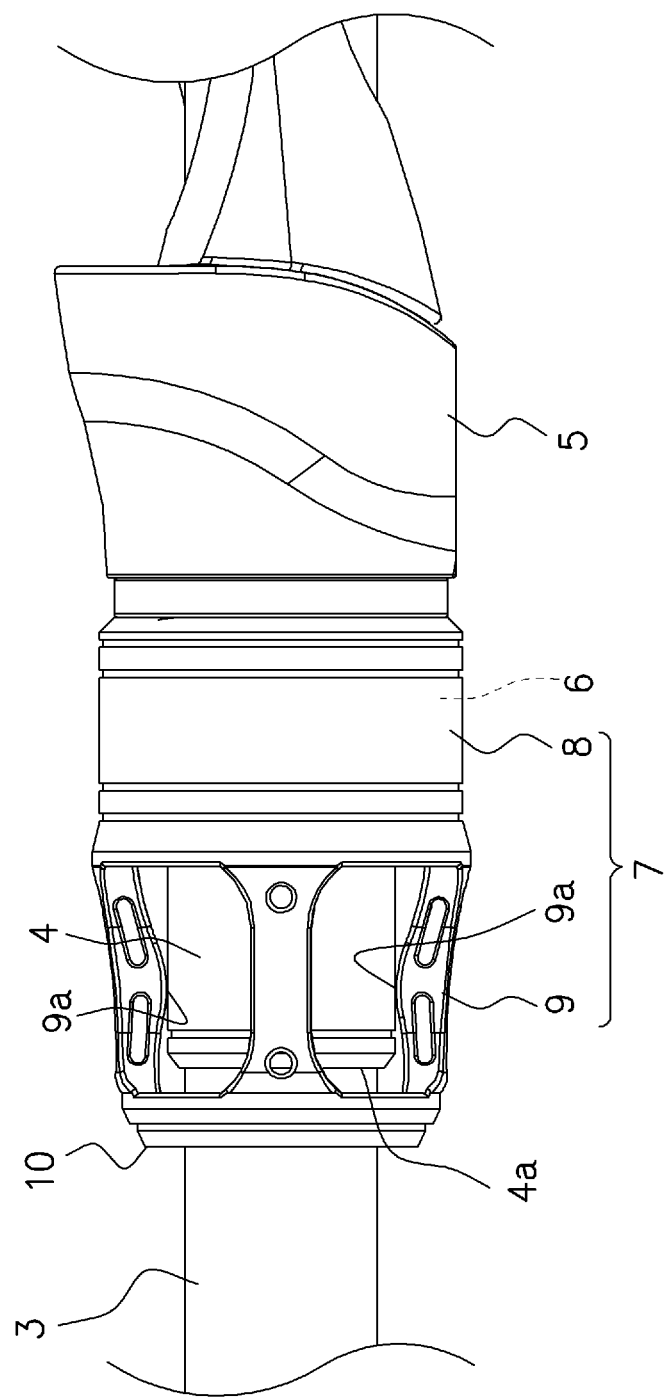
FIG. 4 is a partially enlarged view illustrating an area of a rocker of the fishing rod in the embodiment of the present invention.

When the hood holder 6 is screwed into the reel seat 2 side as explained above, the protruding parts 9a of the support parts 9 get closer to the spacer 4, whereby the rocker 7 constitutes a head rocking structure in which the blank 3 and the hood holder 6 support each other as illustrated in FIG. 4. Thus, the hood holder 6 is supported by the blank 3 via the support parts 9 and the spacer 4, so that even when a force of inclining the hood holder 6 acts due to strongly screwing the hood holder 6, the hood holder 6 can be prevented from becoming eccentric with respect to the blank 3. Further, the blank 3 is supported by the support parts 9 via the spacer 4, so that also when a load acts on the blank 3, the blank 3 can be prevented from becoming eccentric with respect to the hood holder 6. This makes it possible to enhance durability of the blank 3 and directly transmit the force on the grip 1 side to the blank 3 side.

Further, the position where the blank 3 and the hood holder 6 support each other, namely, the position where the protruding parts 9a of the support parts 9 are close to the spacer 4 can be set in front of the hood holder 6. Therefore, the blank 3 can be supported at the front as much as possible to enhance the stiffness.

In this case, the front ends of the support parts 9 are connected to one another via the ring part 10, so that the mutual coupling strength of the support parts 9 can be enhanced to enhance the stiffness of the whole rocker 7 including the support parts 9.

An embodiment of the present invention has been explained in detail referring to the drawings, but the embodiment merely illustrates a concrete example of implementing the present invention. The technical scope of the present invention is not to be limited to the embodiment. The present invention may be implemented in various forms without departing from the technical spirit or main features thereof, and these are also included in the technical scope.

For example, the shape, number, size and so on of the support parts 9 are not limited to the illustrated ones. Further, the spacer 4 does not always need to continue to the front end of the reel seat 2 as long as such a condition is satisfied that when the hood holder 6 is screwed into the reel seat 2 side by the predetermined stroke amount, the protruding parts 9a of the support parts 9 get closer to the spacer 4. Further, as disclosed in Patent Document 1, in the configuration that the grip 1 and the reel seat 2 are externally mounted on the outer peripheral surface of a pipe-shape frame, the frame may be protruded from the front end surface of the reel seat 2 and used as the spacer 4.

The present invention is applicable to a fishing rod in which a reel on a reel seat is fixed by screwing a cylindrical body into a reel seat side.

According to the present invention, it is possible to set a position where a blank is supported, to the front as much as possible and enhance the stiffness of the whole rocker including a support part.

What is claimed is:

1. A fishing rod comprising:
   a reel seat;
   a blank extending from a front end surface of the reel seat;
   a cylindrical spacer provided on the blank on a same axis;
   a hood holder screwed at a front end portion of the reel seat;
   a hood provided at a rear end of the hood holder; and
   a rocker comprising a plurality of support parts extending frontward from a front end of the hood holder and coming into contact with an outer peripheral surface of the cylindrical spacer, wherein
   in a state where the hood holder is screwed into the front end portion of the reel seat, protruding parts of the plurality of support parts contact with the cylindrical spacer,
   wherein an outer peripheral surface and a corresponding inner peripheral surface of a portion of the rocker are divided into the plurality of support parts, each of the plurality of support parts forming a rib, and a front end of the rib of each of the plurality of support parts is connected to the other of the plurality of support parts via a ring, a rear end of the ribs is connected to the other of the plurality of support parts via a cylindrical part,
   wherein the protruding part is formed to be inclined to protrude inward at a middle portion in a front-rear direction of each of the plurality of support parts,
   wherein a length of the ring in the front-rear direction is shorter than a length of the cylindrical portion in the front-rear direction, an outer diameter (D1) of the ring is smaller than an outer diameter (D2) of the cylindrical portion.

2. The fishing rod according to claim 1, wherein
the hood holder is rotatably coupled to the hood and the rocker is fixed on the outer peripheral surface of the hood holder.
3. The fishing rod according to claim 1, wherein
the rib of each of the plurality of support parts is formed such that an outer peripheral surface and a corresponding inner peripheral surface of the rib protrudes inward.

\* \* \* \* \*